United States Patent [19]

Faircloth

[11] Patent Number: 4,697,326
[45] Date of Patent: Oct. 6, 1987

[54] SCREEN MEANS

[76] Inventor: F. Craige Faircloth, 4701-C Hollowell La., Raleigh, N.C.

[21] Appl. No.: 738,239

[22] Filed: May 28, 1985

[51] Int. Cl.[4] .......................... B23P 11/02; A47G 5/00
[52] U.S. Cl. ........................................ 29/448; 160/378
[58] Field of Search .................... 160/378; 29/448, 446

[56] References Cited

U.S. PATENT DOCUMENTS

| | | | |
|---|---|---|---|
| 1,172,441 | 2/1916 | Deaver | 160/378 |
| 1,857,425 | 5/1932 | Brewer | 160/375 |
| 2,498,716 | 2/1950 | Seide | 160/378 |
| 3,469,695 | 9/1969 | Greeninger | 160/378 |

Primary Examiner—Howard N. Goldberg
Assistant Examiner—Steven Nichols
Attorney, Agent, or Firm—Mills & Coats

[57] ABSTRACT

This invention is an improved screen means for greenhouses and similar structures. Cam locks are provided preferably on both the upper and lower edges of the screen means, and are mounted on strong backs which in turn are secured to the structure itself. This arrangement eliminates loose spots, wrinkling, wind flapping, and similar problems that are common to screen means of this general type.

6 Claims, 8 Drawing Figures

SCREEN MEANS

FIELD OF INVENTION

This invention relates to screen means and more particularly to an improved method of securing and maintaining the same in taunt condition.

BACKGROUND OF INVENTION

Since transparent or translucent structures were first built, there has been a problem of how to shade the same during certain times of the day or certain seasons of the year. This is appliable whether a sun room, a passive solar structure, a solarium, various types of greenhouses, and the like.

Various types of coverings, slatted blinds, and other means have been tried over the years. In more recent times, mesh type screens have been developed, made of fiberglass and similar materials. These screens are often fixed along at least one edge and are stretched across the expanse of greenhouse area to be shaded. Light can filter through the screens and yet the desirable shading effect is accomplished. Until now, difficulties have invariably been encountered in having the screens lie juxtaposed to the translucent surface without wrinkling since wrinkling is very unattractive. Also when high wind conditions are encountered, flapping of the screens invariably occurs which is not only unattractive but is annoying and in some instances can actually be structurally damaging and endanger persons in the vicinity thereof.

In attempting to overcome the above-mentioned problems various hold down means have been used including cam type locks connected to the mullions and/or meeting rails of the structures. These efforts have proved unsuccessful in preventing wrinkling of the screens in static conditions and flapping of the screens in high wind conditions.

BRIEF DESCRIPTION OF INVENTION

After much research and study into the above-mentioned problems, the present invention has been developed to provide a means for securing shading screens for greenhouse and similar installations which are disposed smoothly over the entire area being shaded without wrinkles and not being subject to flapping movement in adverse weather.

The above is accomplished through the provision of angle bars extending across the mullions of the building structure with cam type hold down latches spaced at relatively short intervals. The present invention is utilized on opposite edges of the screen means which allows a taunt disposition of the same juxtaposed to the surface being covered without undue or destructive tension being created. A plurality of cam locks are provided at pre-determined, relatively close intervals so that the pressure applied to the screen is effectively uniform.

In view of the above, it is an object of the present invention to provide a screen type shading means that is wrinkle free and flap resistant.

Another object of the present invention is to provide a screen type shading means with a plurality of cam type locks disposed at short intervals along at least two opposed edges thereof.

Another object of the present invention is to provide a screen type shade means with tension fasteners operatively mounted on a support bar to allow such screen to be disposed at locations other than adjacent stucture members.

Another object of the present invention is to provide a screen type shade means connected through cam type locks to angle bars secured to the mullions of the struture being shaded.

Other objects and advantages of the present invention will become apparent and obvious from a study of the following description and the accompanying drawings which are merely illustrative of such invention.

DETAILED DESCRIPTION OF INVENTION

Figure 1:
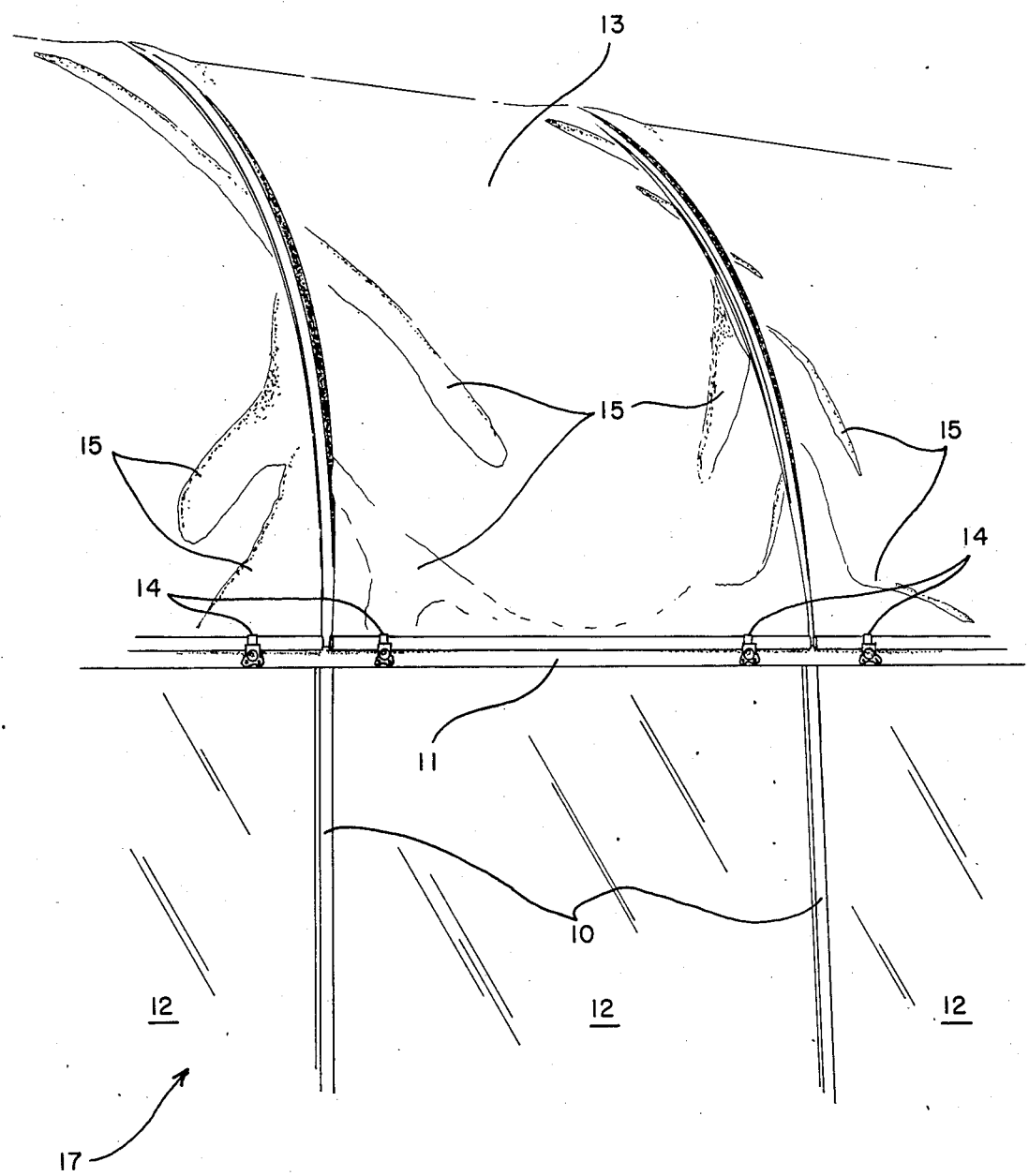
FIG. 1 is a perspective view of prior art screen being used for shading on a greenhouse type structure.

With further reference to the drawings, the prior art, shown in FIG. 1, includes a greenhouse type structure 17 having mullions 10 which are cross supported by meeting rails 11. The mullions 10 and meeting rails 11 have transparent or translucent panels mounted therebetween.

A mesh type screen 13 formed from fiberglass, or similar material is stretched across the upper panels and is secured by clips 14 or similar means to the meeting bars 11 which form part of the support structure for the greenhouse. Although this method of securing mesh type screens has been used for several years, wrinkles as illustrated at 15 invariably occur and even when cam type pull down clips or locks have been used on the meeting rails, the wrinkle problem has not been overcome and is thought to those skilled in the art to be an inherent part of this type of shade means.

Figure 2:
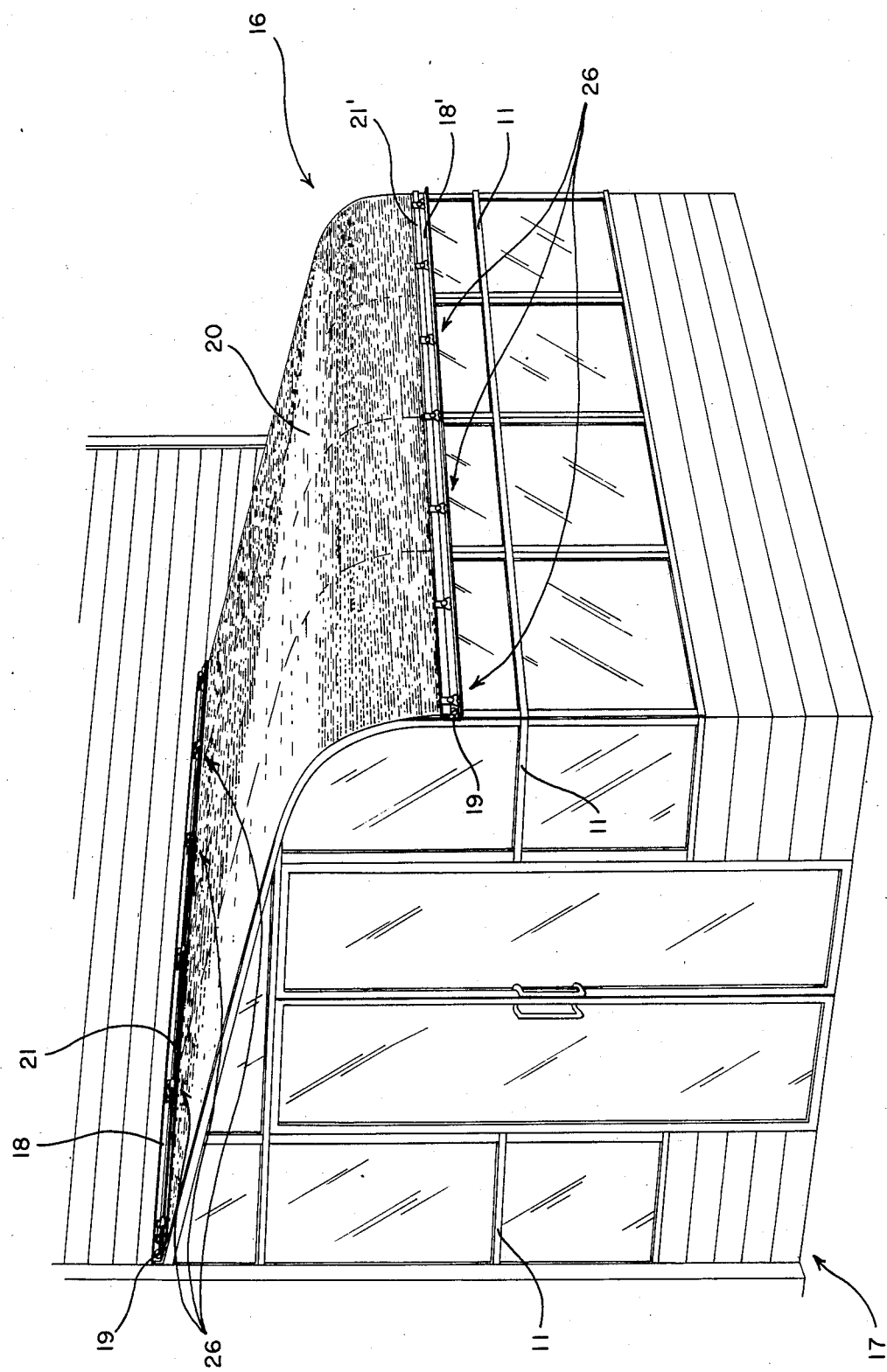
FIG. 2 is a perspective view of the improved screen means of the present invention.
Figure 3:
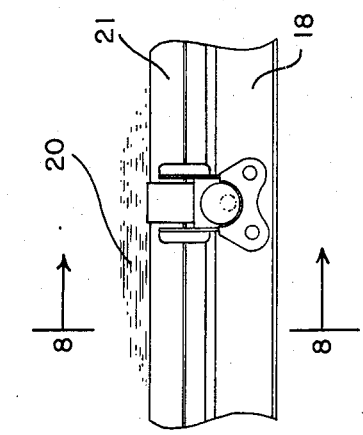
FIG. 3 is a front elevational view of the angle bar and cam lock of the present invention prior to the screen bar being engaged.

The improved screen means of the present invention, indicated generally at 16 in FIG. 2, can be mounted on any standard greenhouse or other structure 17 which needs shading.

An angle bar 18 is mounted on one edge of the area to be shaded and extends between and is secured to mullions 10 or other structural members by means such as screws, bolts, or the like 19. Since securing means of this type are well known to those skilled in the art, further detailed discussion of the same is not deemed necessary.

A second angle bar 18' is disposed across the mullions 10 or other structural portions of the greenhouse or other means to be shaded. Although in some installations it may vary, usually angle bars 18 and 18' will be disposed parallel to each other and generally define the edges of the area over which the mesh type screen 20 is to be disposed.

The screen 20 will usually be rectangular although, as mentioned above, since installations of this type are often custom orders, some variations can be made without departing from this spirit and scope of the present invention.

Figure 4:
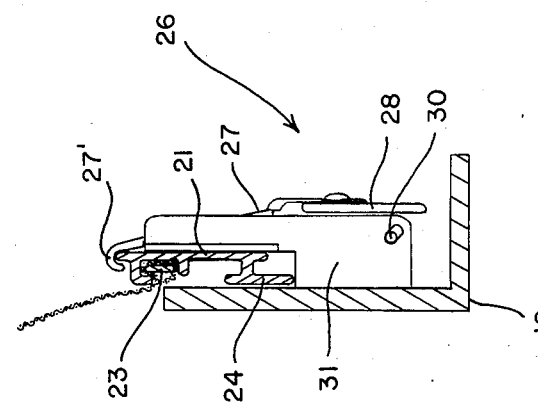
FIG. 4 is an enlarged sectional view taken through lines 4—4 of FIG. 3.
Figure 6:
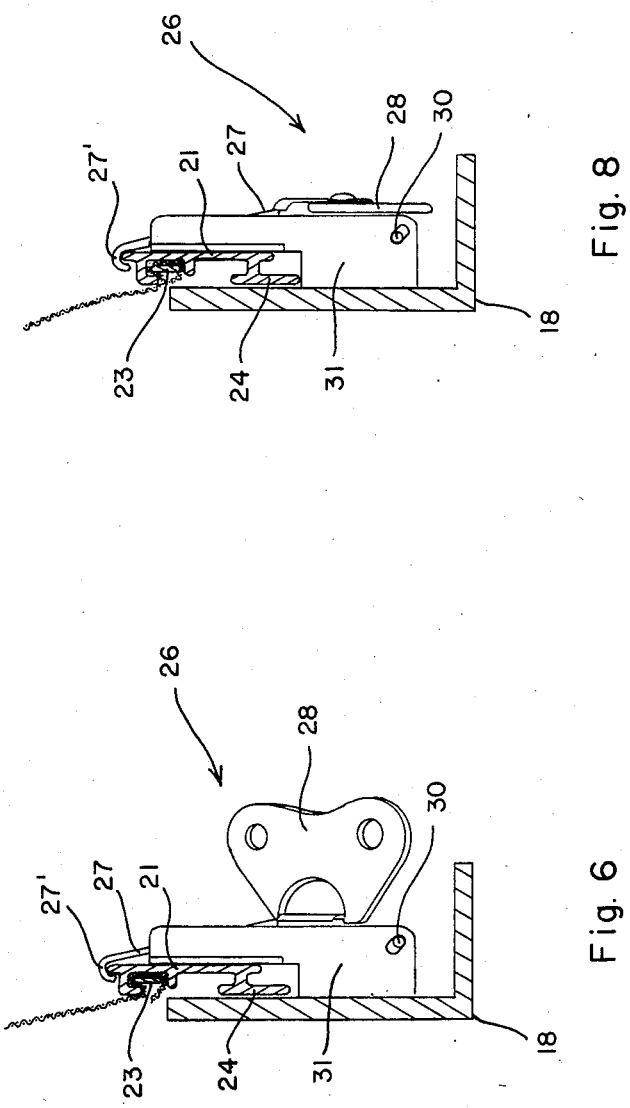
FIG. 6 is an enlarged sectional view taken through line 6—6 of FIG. 5.
Figure 8:
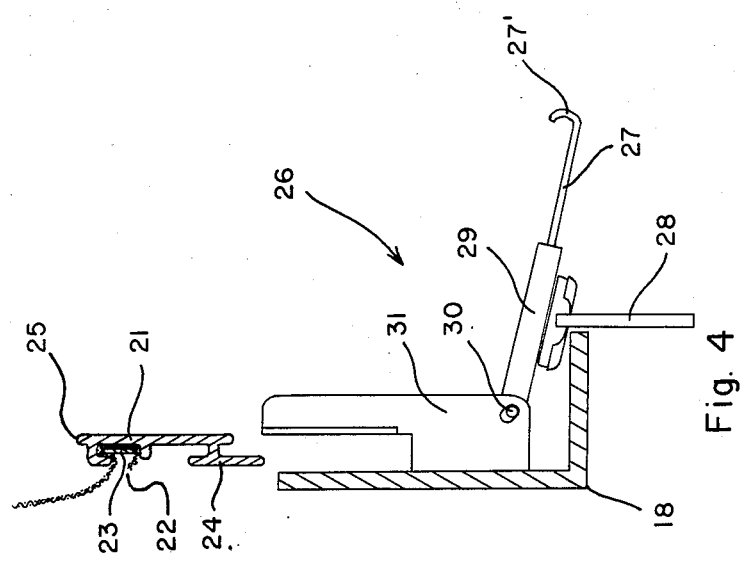
FIG. 8 is an enlarged sectional view taken through line 6—6 of FIG. 7.

The edges of the mesh type screen 20 adjacent angle bars 18 and 18' are mounted to screen bars 21 and 21' by pressing the same into a groove 22 with locking bar 23 as can clearly be seen in FIGS. 4, 6, and 8. Each of the screen bars 21 also includes an elongated presser foot 24 to prevent any tendency of the screen to chaf. Each of the screen bars 21 and 21' additionally includes a lock engaging shoulder 25 whose purpose will hereinafter be described in greater detail.

Spaced at pre-determined, relatively close intervals, preferably not exceeding 15 inches, are a plurality of cam locks or link fasteners as indicated at 26. Each of these locks includes a hook-like pull down 27 operatively mounted within mechanism housing 29 and actuated by folding wing nut 28. This housing is pivotively mounted, as indicated at 30, to lock base 31. Each of the lock bases 30 are fixedly secured to their respective angle bar at the spaced intervals as described above.

Locks of the type described above are well known to those skilled in the art and are commercially available. One such device with a pull down pressure of 90 pounds and is specially manufactured to carry loads up to 600 pounds tension is "Special Number 3-10 Linked-Lock" manufactured by Simmons-Fastener Corporation of North Broadway, Albany, N.Y. 12201. In view of this ready availability, further detailed discussion of the lock fasteners and their method of operation is not deemed necessary.

To install the improved screen means 16 of the present invention, an angle bar 18 is attached to the structural members of the house or other desired location to be shaded. Next, a second angle bar is fixed to such structure parallel to the first angle bar. In at least greenhouse type installations, securing of angle bars to the mullions has been found satisfactory. This also gives greater versatility to the present invention in that the location of the edges of the screen is not dictated by the location of structural components such as meeting rails 11.

Once the angle bars are installed, a properly sized shade means or screen 20 with the screen bars 21 and 21' secured thereto is disposed over the area to be shaded. Next, the hook portions 27' of pull downs 27 of each of the locks 26 is placed in engagement with the shoulder 25 of the adjacent screen bar.

Figure 5:
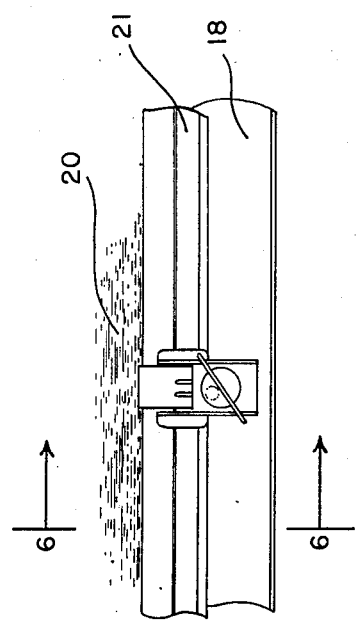
FIG. 5 is a front elevational view of the cam lock in engagement with the screen bar.
Figure 7:
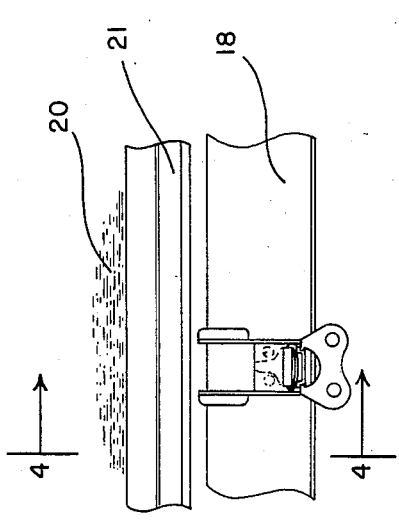
FIG. 7 is a front elevational view of the cam lock securing the screen bar in tensioned, locked position.

The wing nuts 28 of each of the locks 26 mounted on the angle bars 18 and 18' opposite sides of the screen are manipulated to move the screen bars from the position shown in FIGS. 5 and 6 to the position shown in FIGS. 7 and 8. This cam or pull down action places even tension across opposed edges of screen 20. Since this pressure is evenly applied at close intervals along the entire length of each of these opposed edges, a taunt, wrinkle free screen is caused to lie juxtaposed to the surface being covered, and because of such juxtaposition, wind is unable to get under the same to cause flapping, rippling, and the like as is encountered with the prior art screen means.

From the above, it can be seen that the present invention has the advantage of providing a relatively inexpensive and yet highly efficient means of shading desired areas without unsightly wrinkling, objectionable flapping or rippling, or the like. The present invention also can be disposed at any desired location rather than being limited in attachment to meeting rails and similar structural locations.

The present invention can, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. The method of providing a taut, wrinkle free covering juxtaposed to a pre-determined area of a structure having a plurality of vertically extending support member comprising: securing an angle bar means having a plurality of closely spaced cam lock means mounted thereon to said vertically extending support members on opposite sides of said area; attaching screen bar means to a screen type cover means on opposite edges thereof; connectingly engaging said cam lock means with said screen bar means; disposing said cover means over said area; and tightening said cam lock means to pull said screen bar means towards said angle bar means whereby a taut, wrinkle free covering is provided over said area.

2. The method of claim 1 wherein said structure is of the greenhouse type.

3. The method of claim 1 wherein said area being covered is translucent.

4. The method of claim 1 wherein said area to be covered is transparent.

5. The method of claim 1 wherein said screen means is of the mesh type.

6. The method of claim 5 wherein said mesh screen is formed from fiberglass type material.

* * * * *